United States Patent
Li et al.

(10) Patent No.: US 6,658,245 B2
(45) Date of Patent: Dec. 2, 2003

(54) RADIO RECEIVER HAVING A DYNAMIC BANDWIDTH FILTER AND METHOD THEREFOR

(75) Inventors: Junsong Li, Austin, TX (US); Charles E. Seaberg, Austin, TX (US); Jie Su, Austin, TX (US)

(73) Assignee: Motorola, Inc., Schaumburg, IL (US)

( * ) Notice: Subject to any disclaimer, the term of this patent is extended or adjusted under 35 U.S.C. 154(b) by 407 days.

(21) Appl. No.: 09/818,337

(22) Filed: Mar. 28, 2001

(65) Prior Publication Data

US 2002/0142746 A1 Oct. 3, 2002

(51) Int. Cl.[7] .............................. H04B 1/10; H04B 1/16
(52) U.S. Cl. ................... 455/307; 455/306; 455/200.1; 455/339; 375/347; 375/349; 375/350
(58) Field of Search ............................. 455/307, 154.1, 455/168.1, 176.1, 178.1, 180.1, 187.1, 266, 276.1, 280, 281, 339, 306, 200.1; 375/232, 225, 227, 260, 267, 340, 347, 349, 350

(56) References Cited

U.S. PATENT DOCUMENTS

| | | | |
|---|---|---|---|
| 5,168,508 A | * 12/1992 | Iwasaki et al. | 375/130 |
| 5,357,502 A | * 10/1994 | Castelain et al. | 370/210 |
| 5,404,589 A | 4/1995 | Bijker et al. | 455/200.1 |
| 5,465,410 A | * 11/1995 | Hiben et al. | 455/266 |
| 5,493,717 A | * 2/1996 | Schwarz | 455/306 |
| 5,697,084 A | * 12/1997 | Tingley | 455/276.1 |
| 6,069,912 A | * 5/2000 | Sawahashi et al. | 375/142 |

FOREIGN PATENT DOCUMENTS

EP 0 453 213 A2 10/1991

OTHER PUBLICATIONS

International Search Report.
P.O. Vaidyanathan, "Multirate Systems and Filter Banks", 1993 Prentice Hall P T R, Section 4.6, Chapter 4, pp. 151–166.

* cited by examiner

*Primary Examiner*—Edward F. Urban
*Assistant Examiner*—Simon Nguyen
(74) *Attorney, Agent, or Firm*—Daniel D. Hill; Robert L. King (57) ABSTRACT

A radio receiver (100) has an IF (intermediate frequency) filter (200) for dynamically adjusting its intermediate frequency. The filter (200) includes a filter bank (301), power/amplitude estimator circuits (308, 310, 312), and weighting circuits (314, 316, 318). The filter bank (301) generates sub-bands, each sub-band having a predetermined frequency range. The power/amplitude estimators (308, 310, 312) provide an estimated power/amplitude in each sub-band. A filter control (320) uses the power/amplitude estimates to determine a percentage of each sub-band signal that is permitted to be coupled a summation circuit (319). The summation circuit (319) sums the weighted sub-band signals to provide a filtered output signal to a demodulator (212).

21 Claims, 4 Drawing Sheets

RADIO RECEIVER HAVING A DYNAMIC BANDWIDTH FILTER AND METHOD THEREFOR

FIELD OF THE INVENTION

The present invention relates generally to receivers and more specifically to radio receivers having a dynamic bandwidth filter and method therefor.

RELATED ART

In broadband FM (frequency modulation) broadcasting systems, one of the most important features of the system is that the bandwidth of the FM modulated signal (radio signal) changes with the envelope of the modulating signal (audio signal). However, in traditional FM receivers, the bandwidth of the intermediate frequency stage is fixed (about 100 KHz, single sided band). When the received FM signal strength is weak, it may become difficult to have good stereo separation due to excessive noise effect. Also, interference from the adjacent station (200 KHz away from the desired station) will degrade the signal quality or even completely replace the desired station signal if the interfering signal is very strong, due to the capture effect of nonlinear demodulation process. Therefore, it would be desirable to have an FM receiver that can dynamically adjust its IF (intermediate frequency) bandwidth according to signal reception conditions.

BRIEF DESCRIPTION OF THE DRAWINGS

The present invention is illustrated by way of example and not limitation in the accompanying figures, in which like references indicate similar elements, and in which.

Skilled artisans appreciate that elements in the figures are illustrated for simplicity and clarity and have not necessarily been drawn to scale. For example, the dimensions of some of the elements in the figures may be exaggerated relative to other elements to help improve the understanding of the embodiments of the present invention.

DETAILED DESCRIPTION

The conductors as discussed herein may be illustrated or described in reference to being a single conductor, a plurality of conductors, unidirectional conductors, or bidirectional conductors. However, different embodiments may vary the implementation of the conductors. For example, separate unidirectional conductors may be used rather than bidirectional conductors and vice versa. Also, a plurality of conductors may be replaced with a single conductor that transfers multiple signals serially or in a time multiplexed manner. Likewise, single conductors carrying multiple signals may be separated out into various different conductors carrying subsets of these signals. Therefore, many options exist for transferring signals.

Figure 1:
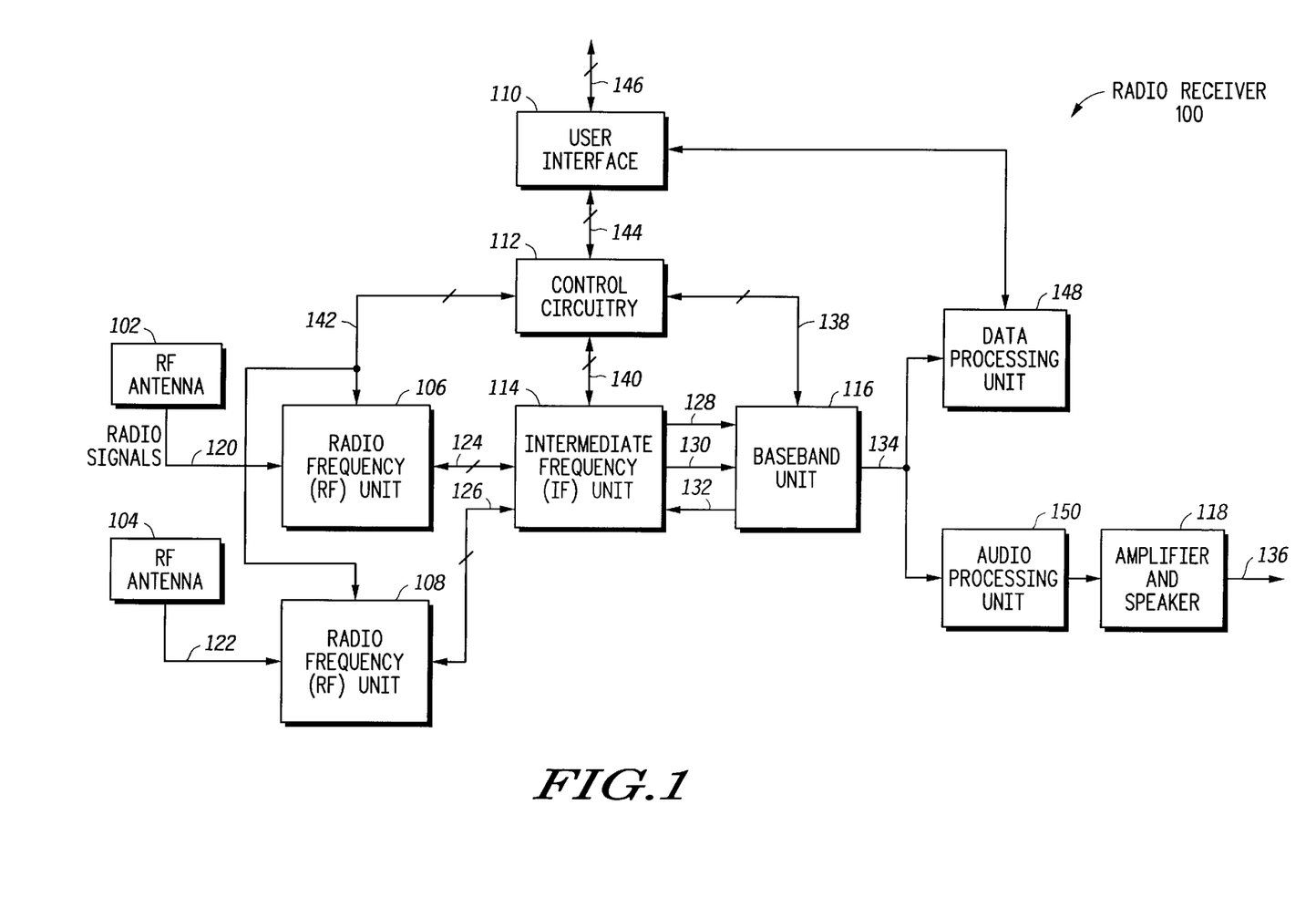
FIG. 1 illustrates, in block diagram form, a radio receiver in accordance with one embodiment of the present invention.

FIG. 1 illustrates a radio receiver 100 in accordance with one embodiment of the present invention. Radio receiver 100 includes user interface 110 bi-directionally coupled via conductors 144 to control circuitry 112. Control circuitry 112 is coupled to radio frequency (RF) units 106 and 108 via conductors 142, to intermediate frequency (IF) unit 114 via conductors 140, and baseband unit 116 via conductors 138. RF Unit 106 is coupled to RF antenna 102 via conductor 120 and is bi-directionally coupled to IF unit 114 via conductors 124. RF Unit 108 is coupled to RF antenna 104 via conductor 122 and is bi-directionally coupled to IF unit 114 via conductors 126. IF unit 114 is coupled to baseband unit 116 via conductors 128, 130 and 132. Baseband unit 116 is coupled to audio processing unit 150 and data processing unit 148 via conductor 134. Audio processing unit 150 is coupled to amplifier and speaker 118 which provides output signals via conductor 136. Data processing unit 148 is bidirectionally coupled to user interface 110. Also, users may provide and receive information to and from user interface 110 via conductors 146.

In operation, RF antennas 102 and 104 capture radio signals and provide them to RF Units 106 and 108, respectively. RF Units 106 and 108 translate the received radio signals to a common intermediate frequency range as dictated by the design of the radio receiver. That is, RF Units 106 and 108 may translate the frequency of the received radio signals to a lower frequency or to a higher frequency depending on the requirements of IF Unit 114 (and thus may be referred to as a "lower frequency unit" or a "higher frequency unit.") IF unit 114 receives the IF signals via conductors 124 and 126 and digitizes them through the use of an analog to digital converter. IF unit 114 also performs digital mixing to produce in-phase and quadrature digitized signals which are output via conductors 128 and 130 to base band unit 116. In alternate tuner embodiments, IF unit 114 is optional. That is, RF units 106 and 108 may translate the received radio signals from antennas 102 and 104 directly to base band and may include an analog to digital converter to provide the digitized base band signals directly to baseband unit 116.

Baseband unit 116 receives the digitized radio signals from intermediate frequency unit 114 or, if the IF unit does not exist in the specific embodiment, directly from RF units 106 and 108. Baseband unit 116 performs signal conditioning, demodulation, and decoding in order to produce audio and data information via conductor 134. The processing performed by baseband unit 116 will be further described in reference to later figures. Audio information via conductor 134 may be provided to audio processing unit 150 which may be coupled to amplifier and speaker 118 to produce an audio output from receiver 100 via conductor 136. For example, this may be music played from audio speakers. Alternatively, baseband unit 116 may output data information via conductor 134 to data processing unit 148 for further processing. The output of data processing unit 148 may be coupled to user interface 110 to allow user interaction with the output of receiver 100. For example, user interface 110 may represent a radio dial, a touch screen, monitor and keyboard, keypad, or any other suitable input/output device. The data information may represent text, graphics, or any other information transmitted in digital form.

In alternate embodiments, radio receiver 100 may be used for different formats of data such as AM, FM, GPS, digital T.V., T.V., digital/audio broadcast, audio broadcast, digital/video broadcast, or the like. Furthermore, receiver 100 may be designed to receive frequencies other than radio frequencies. Antennas 102 and 104 may therefore be referred to as sensors capable of sensing a variety of data formats.

Furthermore, each of the sensors or antennas in the system may receive different formats of data so that, for example, one sensor may receive radio signals while other sensors may receive different types of data as listed above. Also, receiver 100 of FIG. 1 illustrates two sensors or antennas (e.g. antennas 102 and 104); however, alternate embodiments may use any number of sensors for capturing signals or information.

Figure 2:
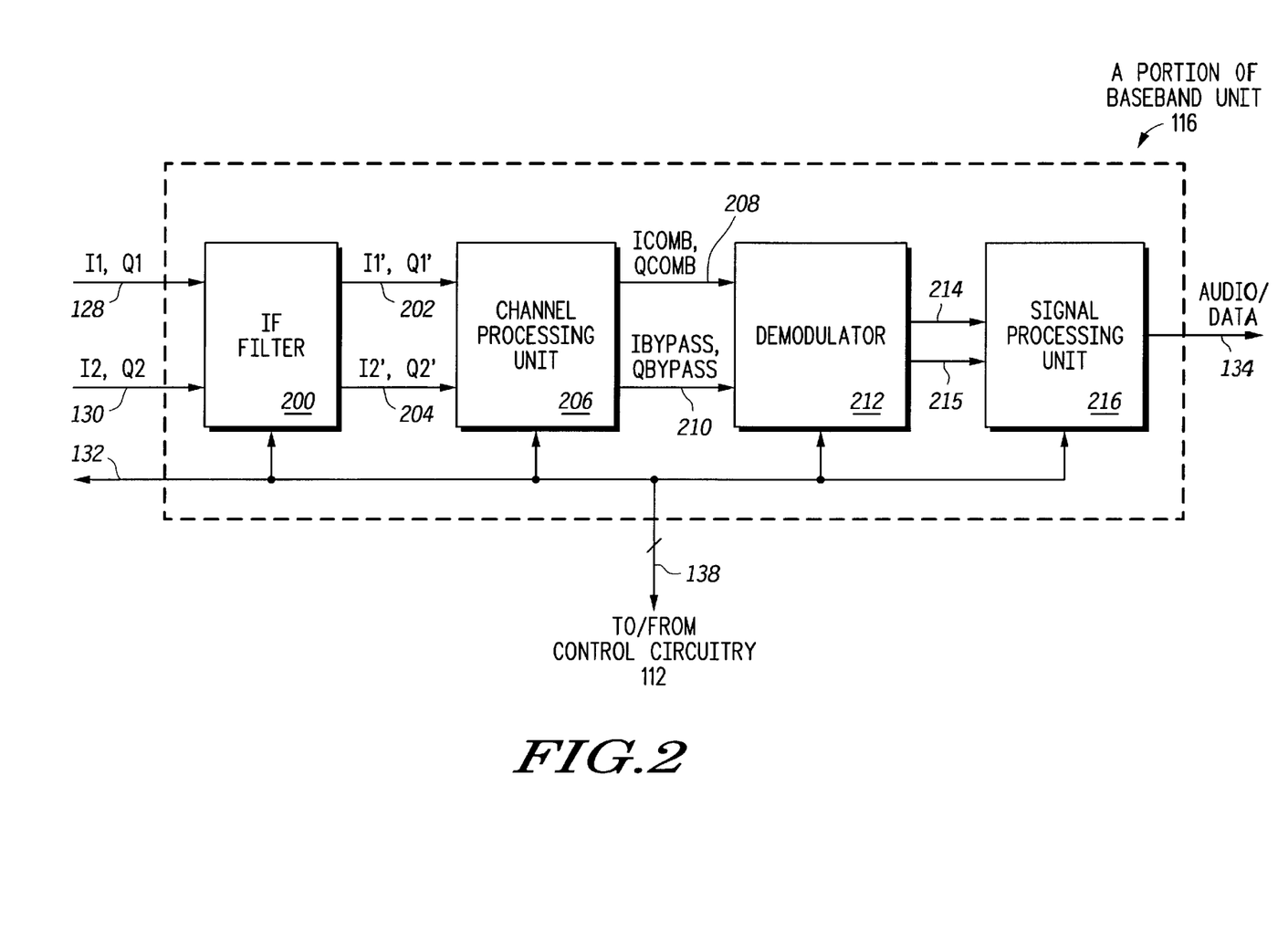
FIG. 2 illustrates, in block diagram form, a portion of a baseband unit of FIG. 1 in more detail.

FIG. 2 illustrates one embodiment of a portion of baseband unit 116. IF filter 200 receives in-phase and quadrature signal pairs I1, Q1 and I2, Q2 via conductors 128 and 130, respectively, where I1, Q1 corresponds to the signal received via sensor or antenna 102 and I2, Q2 corresponds to the signal received via sensor or antenna 104. I1 and I2 represent the digitized in-phase signals while Q1 and Q2 represent the digitized quadrature signals (e.g. signals that are 90 degrees out of phase as compared to the in-phase signals). (Note also that each signal such as I1, Q1 and I2, Q2 can be represented as a complex number where I1 and I2 represent the real portions and Q1 and Q2 represent the imaginary portions, as will be discussed further below.) IF filter 200 is coupled to channel processing unit 206 via conductors 202 and 204. Channel processing unit 206 is coupled to demodulator 212 via conductors 208 and 210, and demodulator 212 is coupled to signal processing unit 216 via conductors 214 and 215. Signal processing unit 216 provides audio/data information via conductor 134. IF filter 200, channel processing unit 206, demodulator 212, and signal processing unit 216 are coupled to control circuitry 112 via conductors 138. Conductors 138 may be referred to as a control bus including a variety of conductors for transferring different signals to and from units 200, 206, 212 and 216. Conductor 132, for example, may include a subset of conductors 138 or may be the full bus 138 which is provided back to intermediate frequency unit 114. Therefore, control signals received via conductor 138 may be transmitted to IF frequency unit 114 via conductor 132. Likewise, these control signals or subsets of these signals may be transmitted back to the RF units 106 and 108 via conductors 124 and 126. Alternatively, control signals may be sent directly from control circuitry 112 to radio frequency units 106 and 108 via conductor 142.

In operation, IF filter 200 removes unwanted signals and noise from the desired frequency range of incoming signals I1, Q1, and I2, Q2. IF filter 200 also suppresses adjacent channels in order to produce filtered in-phase and quadrature signal pairs I1', Q2', and I2', Q2', where I1', Q1' corresponds to I1, Q1 and I2', Q2'corresponds to I2, Q2. Channel processing unit 206 receives I1', Q1'and I2', Q2'and combines these to produce a single combination signal Icomb, Qcomb. Alternatively, if RF units 106 and 108 are tuned to different frequencies then channel processing unit 206 may also provide one or both of its incoming signals such as I1', Q1' or I2', Q2' directly to demodulator 212 via conductors 208 and 210 as Ibypass, Qbypass. Therefore, channel processing unit 206 provides the option of combining its incoming digitized signals or bypassing them directly to further processing units such as demodulator 212. Channel processing unit 206 may also provide both a combined signal such as Icomb, Qcomb and bypass signals such as Ibypass, Qbypass. However, in the case where both channels are bypassed, signals Icomb, Qcomb are used as bypass signals as well. Channel processing unit 206 and Ibypass, Qbypass also provide the ability to receive different types of signal formats such that one signal, such as I1', Q1', may be processed by channel processing unit 206 and output via conductor 208 while a second signal, such as I2', Q2', may be a different signal format that is directly bypassed to demodulator 212. This allows channel processing unit 206 to provide either a single combination signal or various different signals for further processing. For example, one antenna may provide signals from one radio station while a second antenna may provide signals from a second radio station or of a different data format all together. Channel processing unit 206 may also perform noise reduction on the received signals.

Also note that the embodiment illustrated in FIG. 2 illustrates only two signals received by IF filter 200 and channel processing unit 206. However, as was discussed in reference to FIG. 1, receiver 100 may include any number of antennas such as 102 and 104. In this embodiment, each antenna would provide its own in-phase and quadrature signal pair such as I1, Q1 to IF filter 200. Also, IF filter 200 may provide a plurality of filtered in-phase and quadrature signal pairs corresponding to each of the antennas. In this manner, channel processing unit 206 may output a single combination signal or multiple subcombinations of signals, as appropriate. In addition, channel processing unit 206 may provide multiple bypass signals so that more than one incoming signal may be directly bypassed to further processing units such as demodulator 212.

Demodulator 212 receives signals Icomb, Qcomb and Ibypass, Qbypass from channel processing unit 206 and provides demodulated signals to signal processing unit 216 via conductors 214 and 215. Also, if demodulator 212 receives signals Ibypass, Qbypass, demodulator 212 may provide a demodulated Ibypass, Qbypass, also via conductors 214 and 215 to signal processing unit 216. However, as discussed above, Ibypass, Qbypass is optional. For example, in one embodiment, demodulator 212 may be an FM demodulator providing multiplex (MPX) signals corresponding to each of its incoming signals (e.g. Icomb, Qcomb and Ibypass, Qbypass). In alternate embodiments, demodulator 212 may be an AM demodulator or a demodulator specific to any other signal format as required by the system (e.g. receiver 100) and incoming signals I1, Q1 and I2, Q2. Signal processing unit 216 may perform further processing on the signals received via conductors 214, 215 and outputs audio/data information via conductor 134. Audio/data information may include just audio information, just data information or a combination of both audio and data information. This data may then be output to various different systems such as data processing systems or audio processing systems, as illustrated in FIG. 1. For example, in an FM receiver, demodulator 212 outputs an MPX signal to signal processing unit 216 as discussed above. In this embodiment, signal processing unit 216 receives the MPX signal and performs stereo decoding in order to provide the proper signals to each speaker. For example, the MPX signal may be decoded utilizing a pilot tone to provide left and right speaker signals in a stereo system. Also, signal processing unit 216 may demodulate other sub-carrier signals (e.g. RDS or DARC) to provide further information to subsequent processing units.

Figure 3:
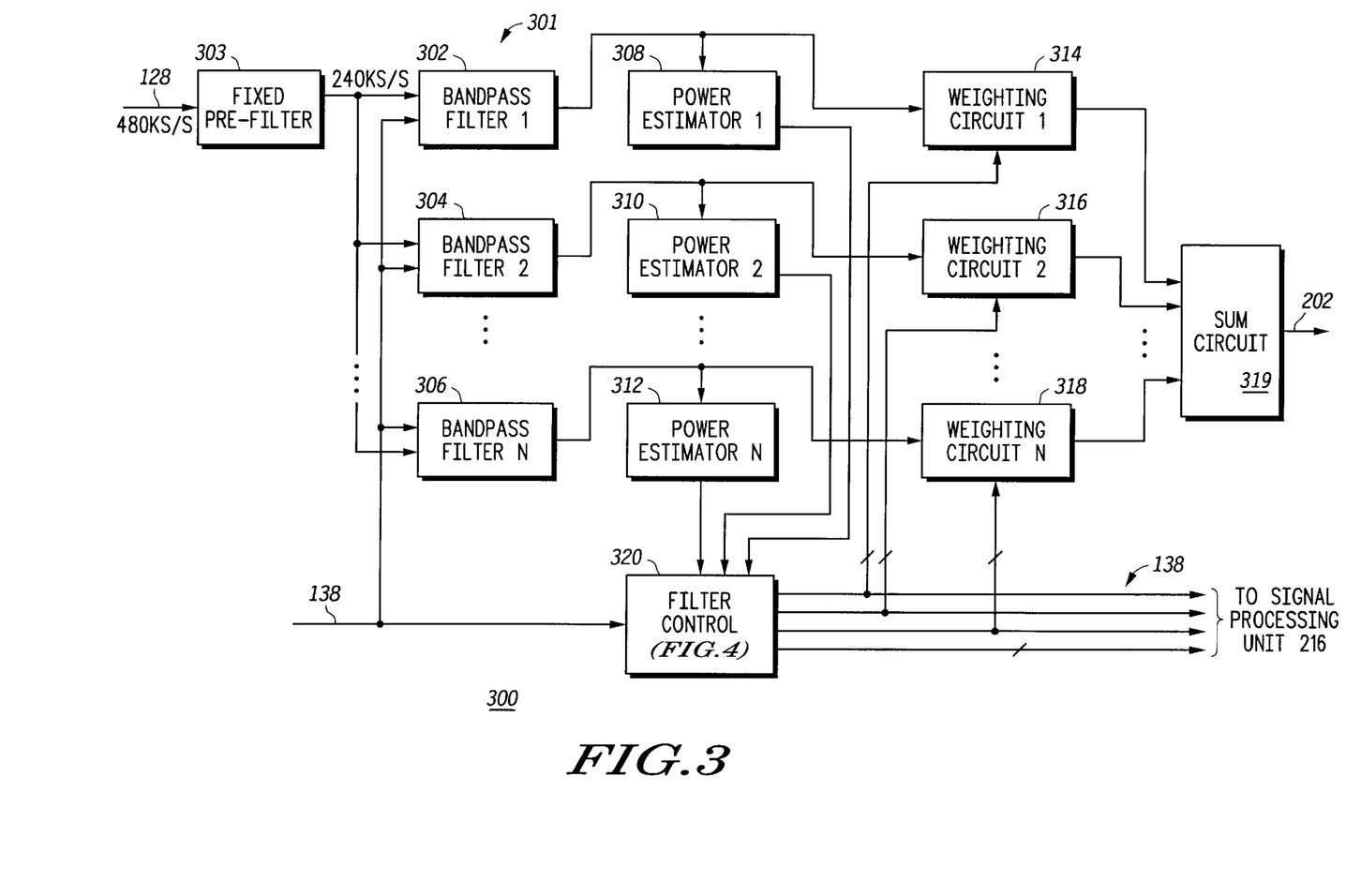
FIG. 3 illustrates, in block diagram form, a portion of the IF filter of FIG. 2 in more detail.

FIG. 3 illustrates, in block diagram form, a filter portion 300 of the IF filter 200 of FIG. 2. Filter portion 300 includes fixed pre-filter 303, filter bank 301, power/amplitude estimators 308, 310, 312, and 320, weighting circuits 314, 316, and 318, and summation circuit 319. In the illustrated embodiment, IF filter 200 includes an additional filter portion that is substantially identical to filter portion 300. The additional filter portion would be coupled between conductors 130 and 204 in FIG. 2.

Fixed pre-filter 303 has an input 128 for receiving incoming signals I1, Q1 at a data rate of 480 KS/s, and an output for providing filter signals at a data rate of 240 KS/s. Bandpass filters 302, 304, and 306 represent a plurality of bandpass filters, labeled as filter bank 301, and each has an input coupled to the output of fixed pre-filter 303. Bandpass filters 302, 304, and 306 also have an input coupled to conductors 138 for providing and receiving signals from control circuitry 112 (FIG. 1). The outputs of bandpass filters 302, 304, and 306 are coupled to inputs of weighting circuits 314, 316, and 318, respectively, and to inputs of power estimators 308, 310, and 320, respectively. Outputs of each of power estimators 308, 310, and 312 are coupled to filter control 320. Filter control 320 is illustrated in more detail in FIG. 4. Filter control 320 has an input coupled to conductors 138, and outputs coupled to conductors 138 for communicating with signal processing unit 216 (see FIG. 2). Weighting circuits 314, 316, and 318 also have inputs coupled to conductors 138, and outputs coupled to summation circuit 319. Summation circuit 319 has an output for providing signals I1', Q1' to channel processing unit 206 (FIG. 2).

In operation, fixed pre-filter 303 receives the digitized inphase and quadrature signals I1 and Q1 from IF unit 114. Fixed pre-filter 303 is implemented as a bandpass filter and provides additional stopband attenuation and allows a reduction of the sample rate from 480 KS/s (kilo samples per second) to 240 KS/s. The additional attenuation of the fixed pre-filter allows for a simpler filter bank and the reduction in sample rate reduces the computations needed to implement filter portion 300. Each of the bandpass filters of filter bank 301 receives the stopband attenuated intermediate frequency signal and generates a plurality of sub-band signals, each of the plurality of sub-band signals having a predetermined frequency range. In the illustrated embodiment, the Nyquist frequency bandwidth is partitioned into M sub-bands, where M is equal to 16. In other embodiments, M can be any number of sub-bands. Digital filter bank 301 is a filter composed of many sub-filters that are designed with particular characteristics so that the sub-bands are added together to form the whole signal. Bandwidth control of filter bank 301 is not affected by the choice of transfer function or filter. This eliminates a need to open up the bandwidth of the filter to check conditions, and thus risk allowing a degraded signal through the filter. Digital filter bank 301 decomposes the signal received on conductor 128 into multiple sub-band signals. Each sub-band filter 302, 304, and 306 has a linear-phase response. When some or all of the sub-band filters are weighted and summed together, a desired-passband and linear-phase bandpass filter is obtained. In the illustrated embodiment, the linear phase bandpass filter has a relatively flat passband.

Power estimators 308, 310, and 312 monitor the sub-band signals and estimate the power in each of the sub-bands. The power estimates are provided to filter control 320. Note that in the illustrated embodiment, power estimates are used. In other embodiments, other parameters may be monitored, such as for example, amplitude or energy of the sub-band signals. Filter control 320 receives the power estimates from the power estimators and provides one or more control signals that determine a percentage of each sub-band signal that is permitted to be coupled to summation circuit 319. In the illustrated embodiment, weighting circuits 314, 316, and 318 function to generate a weighting factor for determining how many of the bandpass filter outputs are allowed to be provided to summation circuit 319 and/or the percentage of each sub-band signals that is permitted to be coupled to summation circuit 319. That is, filter bank 301 receives a corrupted incoming signal and first decomposes the signal into multiple sub-band signals. Then, reception quality of the signal is continuously monitored by checking the power or amplitude of each sub-band signal regardless of use or weight. A set of weights is chosen to combine the sub-band signals together to generate a dynamically filtered output signal. Summation circuit 319 is implemented as an adder and sums the weighted sub-band signals to provide a filtered output signal. Demodulator 212 (FIG. 2) is coupled to the summing circuit for demodulating the filtered output signal to provide an audio output signal with optional data.

By implementing filter portion 300 as described above, it is possible to selectively reject sub-bands with adjacent channel energy and shrink the effective bandwidth of the filter in low frequency deviation or noisy conditions.

Note that FIG. 3 shows filter bank 301 implemented as a plurality of parallel-connected bandpass filters. However, filter bank 301 can also be implemented, for example, by using a technique described in "Multirate Systems and Filter Banks", by P. P. Vaidyanatha, page 165, published in 1993 by Prentice Hall. The bandpass filter of the illustrated embodiment must have characteristics such that the phase linearity and desired passband characteristics of a partial or whole sum are preserved.

Note that the weighting circuit output signals of filter control 320 are also provided to signal processing unit 216 to detect frequency overdeviation of the desired signal and frequency overdeviation of the adjacent channel.

Figure 4:
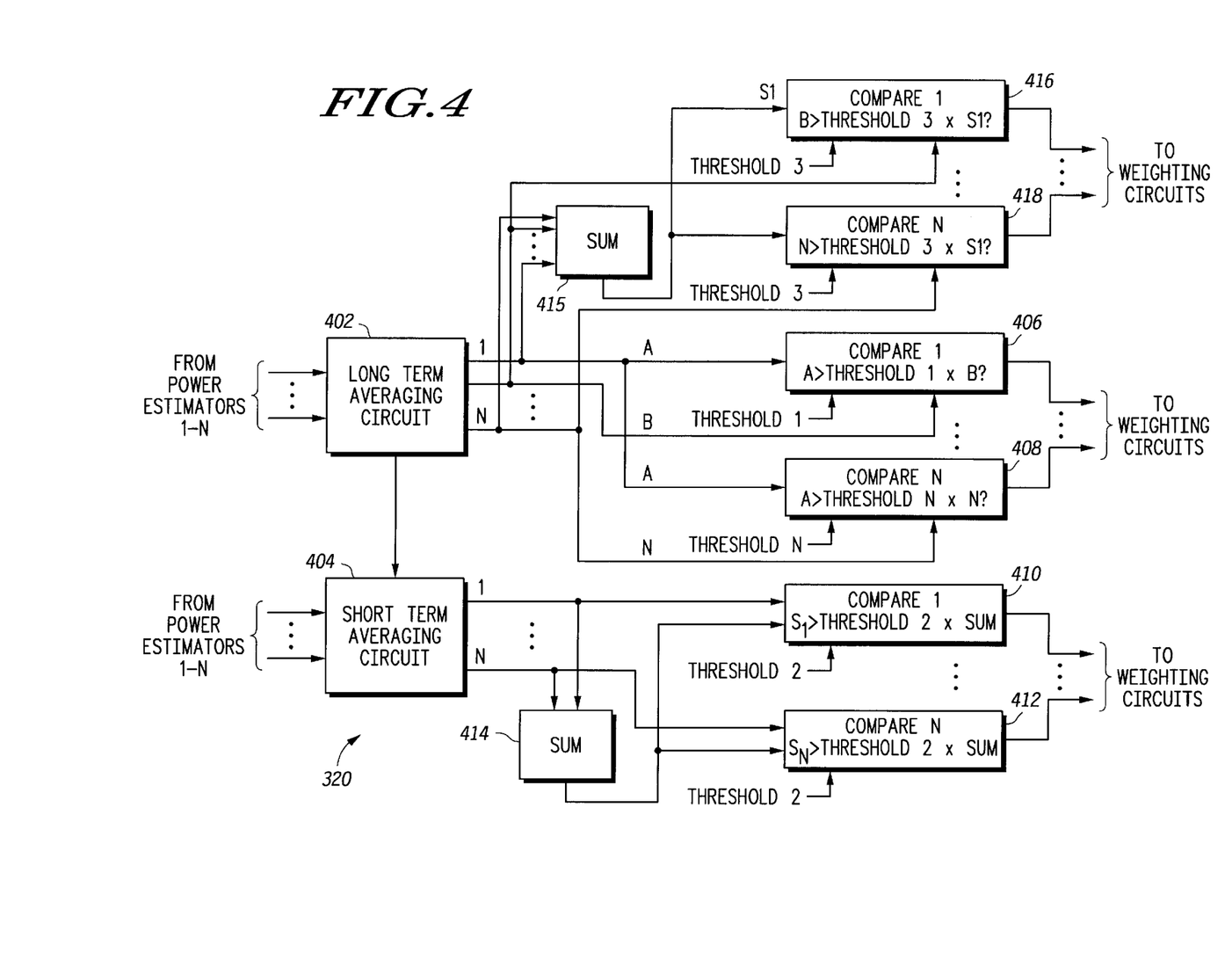
FIG. 4 illustrates, in block diagram form, the filter control block of FIG. 3 in more detail.

FIG. 4 illustrates, in block diagram form, filter control block 320 of FIG. 3 in more detail. Filter control block 320 includes long term averaging circuit 402, short term averaging circuit 404, summation circuits 414 and 415, and compare circuits 406, 408, 410, 412, 416, and 418.

Long term averaging circuit 402 has a plurality of inputs coupled to power estimators 308, 310, and 312, and a plurality of outputs coupled to summation circuit 415 and compare circuits 406, 408, 416, and 418. Also, long term averaging circuit 402 has an input coupled to short term averaging circuit 404. Short term averaging circuit 404 has a plurality of input coupled to power estimators 308, 310, and 312, and a plurality of outputs coupled to summation circuit 414 and compare circuits 410 and 412. Summation circuit 415 has an output coupled to each of compare circuits 416 and 418. Summation circuit 414 has an output coupled to each of compare circuits 410 and 412. Each of compare circuits 406, 408, 410, 412, 416, and 418 has an input for receiving a threshold value and an output coupled to weighting circuits 314, 316, and 318.

Filter portion 300 operates in three modes. In a first mode, filter portion 300 removes or attenuates adjacent channel energy encroaching on the desired channel. In this mode, long term averaging circuit 402 receives power estimates from power estimators 308, 310, 312, and 320 to perform a power averaging function in a predetermined timeframe to provide a plurality of averaged parameter signals and calculates the weights of each frequency sub-band. The lowest frequency sub-band is used as a reference signal for each of compare circuits 406, 408, 416, and 418. The power estimate for the lowest sub-band is long term averaged and used as a reference for determining each of the weight of the remaining sub-bands. The weight of each of the sub-bands is determined by comparing the reference to the long term average power estimate for the particular sub-band multiplied by a predetermined threshold value labeled "THRESHOLD 1 " to "THRESHOLD N". As a result, if the output of long term averaging circuit is higher than the reference, then a signal is provided to the corresponding weighting circuit, attenuating the output of the weighting circuit that is to be summed by summing circuit 319. The level of attenuation can between zero percent and 100 percent of the sub-band output. In this manner, large adjacent channel interferers are detected and removed or at least attenuated. In addition, the desired sub-band levels may be amplified by using a weighting factor, or threshold value, greater than one. The desired signal is not attenuated as it generally has equal or lower power in the sub-band relative to the lowest sub-band.

In a second mode of operation, if none of the comparisons of compare circuits 406 to 408 are true, then filter 300 uses summing circuit 415 and comparison circuits 416 to 418 to prevent filter 300 from attenuating any of the received signal. Summing circuit 415 adds each of the outputs of the long term averaging circuit 402 to produce a summed signal labeled "S1". The Comparison circuits 416 to 418 compare S1 to each of the 2 through N outputs of the long term averaging circuit 402 multiplied by a predetermined threshold value. When the received signal power is large enough or the frequency deviation of the signal is wide enough, the output of each comparator is then provided to the weighting circuits that only attenuate sub-bands without significant signal power or simply add together all sub-band signals in order not to generate any distortion to the FM signal.

In the third mode of operation, filter 300 will shrink the effective bandwidth of the filter in low frequency deviation or noisy conditions. To shrink the effective bandwidth of the filter, short term averaging circuit 404 is used to provide a second plurality of averaged parameter signals. Short term averaging circuit 404 has a power averaging timeframe that is less than the averaging timeframe of long term averaging circuit 402. Short term averaging circuit 404 begins averaging when there is no adjacent channel interference and the output of summing circuit 415 is relatively small. The output signals from short term averaging circuit 404 are provided to a summing circuit 414 and to inputs of comparison circuits 410 and 412. Note that comparison circuits 416 and 418 compare whether the first of the plurality of averaged parameter signals from the long term averaging circuit 402 is greater than a product of a predetermined threshold value and a predetermined one of the plurality of averaged parameter signals. Comparison circuits 410 and 412 compare whether a predetermine one to the averaged parameter signals is greater than a product of a threshold value and the sum from summation circuit 414 to provide a control signals to the weighting circuits. Note that in the illustrated embodiment, for purposes of simplicity and clarity, only two of 16 compare circuits 410 and 412 are shown. The output of summing circuit 414 is used as a reference for each of the comparison circuits 410, 412 and is compared to the output signals from short term averaging circuit 404 multiplied by a predetermined threshold labeled THRESHOLD 2. The outputs of comparators 410 and 412 are provided to the weighting circuits of FIG. 3 to attenuate the sub-bands that have relatively little signal power. The faster time constant of short term averaging circuit 404 allows for more rapid bandwidth changes and trades signal distortion for less noise. Note that each of the threshold values 1 through N provided to the comparison circuits is different.

A user may selectively configure the power estimating circuits to control and vary a number of sub-bands which may be modified in response to predetermined values of the one or more control signals. The percentage of each sub-band signal that is permitted to be coupled to the output 134 varies dynamically in a predetermined range. A status circuit may be included with filter control 320 to provide an indication as to how many sub-band signals are permitted to be passed to the summing circuit and what reception quality exists. The invention can be used in any of a number of products, such as for example, an FM receiver, an AM receiver, a land mobile phone, a television receiver, a personal digital assistant product, a computer, a wireless communication device, a satellite receiver or an OFDM (orthogonal frequency division multiplexer) receiver.

In the foregoing specification, the invention has been described with reference to specific embodiments. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention.

Benefits, other advantages, and solutions to problems have been described above with regard to specific embodiments. However, the benefits, advantages, solutions to problems, and any element(s) that may cause any benefit, advantage, or solution to occur or become more pronounced are not to be construed as a critical, required, or essential feature or element of any or all the claims. As used herein, the terms "comprises," "comprising," or any other variations thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A radio receiver comprising:
   an input portion having a tuner for selectively receiving an input modulated signal and mixing the input modulated signal with a local signal to generate an intermediate frequency signal;
   a filter bank for receiving the intermediate frequency signal and generating a plurality of sub-band signals, each of the plurality of sub-band signals having a predetermined frequency range;
   a monitoring circuit coupled to the filter bank, the monitoring circuit measuring a predetermined parameter of each of the sub-band signals and providing a plurality of parameter signals in response thereto;
   a control circuit coupled to the monitoring circuit for receiving the plurality of parameter signals, the control circuit provides one or more control signals which determine a percentage of each of the sub-band signals which is permitted to be coupled to an output terminal;
   a summing circuit coupled to the output terminal for receiving the percentage of each of the sub-band signals from the monitoring circuit and adding the percentage of each of the sub-band signals to provide a filtered output signal; and
   a demodulator coupled to the summing circuit for demodulating the filtered output signal to provide an audio output signal with optional data.

2. The receiver of claim 1 wherein the parameters comprise measuring either power of the sub-band signals or measuring amplitude of the sub-band signals.

3. The receiver of claim 1 further comprising:
   a plurality of weighting circuits coupled to the filter bank and the control circuit, each of the plurality of weighting circuits receiving a predetermined one of the one or more control signals and applying a weighting factor to a predetermined one of the sub-band signals, the weighting factor determining the percentage of each of the sub-band signals.

4. The receiver of claim 1 wherein the control circuit further comprises:
  a first timeframe power/amplitude averaging circuit for receiving the plurality of parameter signals, the first timeframe power/amplitude averaging circuit performing a time averaging function on each of the parameters and providing a first plurality of averaged parameter signals, each of which corresponding to a predetermined frequency sub-band, and a first of which corresponding to a lowest frequency sub-band and being used as a reference signal;
  a second timeframe power/amplitude averaging circuit for receiving the plurality of parameter signals, the second timeframe power/amplitude averaging circuit performing a time averaging function on each of the parameters which is shorter in time than the time averaging function performed by the first timeframe to provide a second plurality of averaged parameter signals;
  a first plurality of comparators coupled to the first timeframe power/amplitude averaging circuit, the first plurality of comparators comparing whether the first of the plurality of averaged parameter signals from the first timeframe power/amplitude averaging circuit is greater than a first product of a predetermined threshold value and a predetermined one of the plurality of averaged parameter signals, the first plurality of comparators providing a first portion of the control signals;
  a second summing circuit coupled to the second timeframe power/amplitude averaging circuit, the second summing circuit adding each of the second plurality of averaged parameter signals to provide a first sum signal;
  a second plurality of comparators coupled to the second timeframe power/amplitude averaging circuit, the second plurality of comparators comparing whether a predetermined one of the second plurality of averaged parameter signals is greater than a second product of a second threshold value and the first sum signal to provide a second portion of the control signals;
  a third summing circuit coupled to the first timeframe power/amplitude averaging circuit, the third summing circuit adding each of the first plurality of averaged parameter signals to provide a second sum signal; and
  a third plurality of comparators coupled to the first timeframe power/amplitude averaging circuit, the first plurality of comparators comparing whether a predetermined one of the first plurality of averaged parameter signals is greater than a third product of a third threshold value and the second sum signal to provide a third portion of the control signals.

5. The receiver of claim 4 wherein the predetermined threshold value comprises a plurality of differing values.

6. The receiver of claim 4 wherein the receiver is an FM receiver and the first portion of control signals limits passage of the intermediate frequency signal in response to detection by the first timeframe power/amplitude averaging circuit of either adjacent interference or the adjacent interference being frequency overdeviated.

7. The receiver of claim 6 wherein the second portion of control signals limits passage of the intermediate frequency signal in response to a lack of detection by the first timeframe power/amplitude averaging circuit of adjacent interference and when long term average power/amplitude is below a threshold.

8. The receiver of claim 4 wherein the receiver is an FM receiver and the third portion of control signals limits passage of the intermediate frequency signal in response to a detection by the first timeframe power/amplitude averaging circuit of when a long term average power/amplitude of the receiver is either above or below respective predetermined ratios or when there is over-deviation of the input modulated signal.

9. The receiver of claim 4 wherein the control circuit asserts the first portion of the control signals to limit passage of the intermediate frequency signal before asserting either the second portion of control signals or the third portion of control signals, and the control circuit asserts the first portion of the control signals and the third portion of the control signals before asserting the second portion of control signals.

10. The receiver of claim 1 wherein the percentage of each sub-band signal that is permitted to be coupled to the output terminal varies dynamically in a predetermined range.

11. The receiver of claim 1 wherein the receiver receives signals in one of the following products: an FM receiver, an AM receiver, a land mobile phone, a television receiver, a personal digital assistant product, a computer, a wireless communication device, a satellite receiver or an OFDM (orthogonal frequency division multiplexer) receiver.

12. The receiver of claim 1 wherein a user may selectively configure the monitoring circuit to control and vary a number of sub-bands which may be modified in response to predetermined values of the one or more control signals.

13. The receiver of claim 1 further comprising status circuitry coupled to the control circuit for utilizing the one or more control signals and providing at least an indication as to how many sub-band signals are permitted to be passed to the summing circuit and what reception quality exists.

14. The receiver of claim 1, wherein the filter bank comprises a plurality of sub-band filters, each of the plurality of sub-filters having a linear phase response and for generating a corresponding one of the plurality of sub-band signals, wherein when the percentage of each of the sub-band signals is added by the summing circuit to provide a filtered output signal having desired-passband and linear-phase bandpass filter characteristics.

15. A method of dynamic filtering in a receiver, comprising:
  selectively receiving an input modulated signal with a tuner and mixing the input modulated signal with a local signal to generate an intermediate frequency signal;
  generating a plurality of sub-band signals, each of the plurality of sub-band signals having a predetermined frequency range;
  measuring a predetermined parameter of each of the sub-band signals and providing a plurality of parameter signals in response thereto;
  providing one or more control signals which determine a percentage of each of the sub-band signals which is permitted to be coupled to an output terminal;
  generating the percentage of each sub-band signal and adding the percentage of each of the sub-band signals to provide a filtered output signal; and
  demodulating the filtered output signal to provide an audio output signal.

16. The method of claim 15 further comprising:
  applying a weighting factor to a predetermined one of the sub-band signals, the weighting factor determining the percentage of each of the sub-band signals.

17. A dynamic receiver with varying reception parameters comprising:
- a filter bank for receiving an input signal and generating a plurality of sub-band signals, each of the plurality of sub-band signals having a predetermined frequency range;
- a monitoring circuit coupled to the filter bank, the monitoring circuit measuring a predetermined parameter of each of the sub-band signals and providing a plurality of parameter signals in response thereto;
- a control circuit coupled to the monitoring circuit for receiving the plurality of parameter signals, the control circuit provides one or more control signals which determine a percentage of each of
- the sub-band signals which is permitted to be coupled to an output terminal; and
- a summing circuit coupled to the output terminal for receiving the percentage of each of the sub-band signals from the monitoring circuit and adding the percentage of each of the sub-band signals to provide a filtered output signal.

18. The receiver of claim 17 further comprising:
- a plurality of weighting circuits coupled to the filter bank and the control circuit, each of the plurality of weighting circuits receiving a predetermined one of the one or more control signals and applying a weighting factor to a predetermined one of the sub-band signals, the weighting factor determining the percentage of each of the sub-band signals.

19. The receiver of claim 18 wherein the control circuit:
- a first timeframe power/amplitude averaging circuit for receiving the plurality of parameter signals, the first timeframe power/amplitude averaging circuit performing a time averaging function on each of the parameters and providing a first plurality of averaged parameter signals, each of which corresponding to a predetermined frequency sub-band, and a first of which corresponding to a lowest frequency sub-band and being used as a reference signal;
- a second timeframe power/amplitude averaging circuit for receiving the plurality of parameter signals, the second timeframe power/amplitude averaging circuit performing a time averaging function on each of the parameters which is shorter in time than the time averaging function performed by the first timeframe to provide a second plurality of averaged parameter signals;
- a first plurality of comparators coupled to the first timeframe power/amplitude averaging circuit, the first plurality of comparators comparing whether the first of the plurality of averaged parameter signals from the first timeframe power/amplitude averaging circuit is greater than a first product of a predetermined threshold value and a predetermined one of the plurality of averaged parameter signals, the first plurality of comparators providing a first portion of the control signals;
- a second summing circuit coupled to the second timeframe power/amplitude averaging circuit, the second summing circuit adding each of the second plurality of averaged parameter signals to provide a first sum signal;
- a second plurality of comparators coupled to the second timeframe power/amplitude averaging circuit, the second plurality of comparators comparing whether a predetermined one of the second plurality of averaged parameter signals is greater than a second product of a second threshold value and the first sum signal to provide a second portion of the control signals;
- a third summing circuit coupled to the first timeframe power/amplitude averaging circuit, the third summing circuit adding each of the first plurality of averaged parameter signals to provide a second sum signal; and
- a third plurality of comparators coupled to the first timeframe power/amplitude averaging circuit, the first plurality of comparators comparing whether a predetermined one of the first plurality of averaged parameter signals is greater than a third product of a third threshold value and the second sum signal to provide a third portion of the control signals.

20. The receiver of claim 17 further comprising:
status circuitry coupled to the control circuit for utilizing the one or more control signals and providing at least an indication as to how many sub-band signals are permitted to be passed to the summing circuit and what reception quality exists.

21. The receiver of claim 17 further comprising:
- a fixed frequency prefilter coupled to the filter bank, the fixed frequency prefilter receiving the input signal and prefiltering the input signal to provide a reduced sampling frequency signal to the filter bank, thereby simplifying design complexity of the filter bank.

* * * * *